United States Patent [19]

Harmeyer

[11] Patent Number: 5,263,732
[45] Date of Patent: Nov. 23, 1993

[54] THREE WHEEL RECUMBENT VEHICLE

[76] Inventor: Jerome E. Harmeyer, 1657 Ontario #9, Sunnyvale, Calif. 94087

[21] Appl. No.: 804,083

[22] Filed: Dec. 6, 1991

[51] Int. Cl.⁵ ............... B62K 5/02; B62K 21/10; B62K 23/06; B62M 1/06
[52] U.S. Cl. .................. 280/288.1; 280/103; 280/112.2; 280/259; 280/263; 280/282; 280/772
[58] Field of Search ............. 280/288.1, 259, 263, 280/98, 100, 103, 282, 261, 112.2, 772

[56] References Cited

U.S. PATENT DOCUMENTS

| | | | |
|---|---|---|---|
| 718,440 | 1/1903 | Elsner | 280/103 |
| 2,147,732 | 2/1939 | Boynton | 280/261 |
| 3,753,577 | 8/1973 | Robinson | 280/261 |
| 3,913,929 | 10/1975 | Matsurra | 280/7.14 |
| 3,981,516 | 9/1976 | Häggkvist | 280/263 |
| 4,283,070 | 8/1981 | Forrestal et al. | 280/288.1 |
| 4,373,740 | 2/1983 | Hendrix | 280/288.1 |
| 4,410,198 | 10/1983 | Fernandes et al. | 280/288.1 |
| 4,432,561 | 2/1984 | Feikema et al. | 280/288.1 |
| 4,456,277 | 6/1984 | Carpenter | 280/282 |
| 4,548,421 | 10/1985 | Wiener | 280/288.1 |
| 4,659,098 | 4/1987 | Jacobson | 280/288.1 |
| 4,878,684 | 11/1989 | Lemle | 280/288.1 |
| 4,993,733 | 2/1991 | Ellers | 280/261 |
| 5,154,437 | 10/1992 | Inagaki et al. | 280/100 |

FOREIGN PATENT DOCUMENTS 1406024 6/1988 U.S.S.R. ............ 280/288.1

Primary Examiner—Mitchell J. Hill

[57] ABSTRACT

A short wheel base, three wheel recumbent vehicle comprising a main frame including a plurality of tubular members assembled in truss like fashion. A single rear drive wheel driven by a multi-speed chain drive pedal crank assembly mounted on extended front frame to provide clearance for riders feet. Two front steerable wheels positioned with foreshortened wheel base are rotably mounted to the main frame and actuated by tie rods from a center pivot plate connected to a steering bar to provide short turning radius vehicle with improved steering for reduced rolling friction. Adjustable mounting location for steering push rod provides steering sensitivity adjustability. A seat mounted to the frame in front of rear drive wheel midway between the wheel base.

9 Claims, 5 Drawing Sheets

THREE WHEEL RECUMBENT VEHICLE

BACKGROUND

1. Field of Invention

The present invention relates to recumbent vehicles and particularly to three wheel pedalled vehicles wherein the vehicle includes a single rear drive wheel and two front steerable wheels.

2. Description of the Prior Art

Recumbent vehicles are constructed so that the rider is in a natural seated position with a feet forward orientation, usually with a back rest and in a nearly horizontal position. The advantages of this position over the conventional bicycle upright position are widely known and include a more comfortable riding position, greater power applied to the pedals, and improved safety in collisions due to the feet forward position. In addition, the lower riding position provides a low center of gravity for greater stability and reduced wind resistance.

Various patents have described recumbent vehicles including U.S. Pat. Nos. 4,659,098; 4,283,070; 2,147,732; and 4,878,684. Although these describe vehicles providing recumbent position, they are two wheel vehicles which are unstable at low speeds and difficult to ride particularly during starting and stopping and typically have long wheel bases and poor maneuverability.

Three wheel recumbent vehicles provide all the advantages associated with the recumbent position and in addition provide a totally stable vehicle which can start and stop without the rider putting his feet on the ground, and require no special skills or training to learn to ride.

Prior art patents which describe three wheel recumbent vehicles include U.S. Pat. Nos. 3,981,516; 4,432,561; and 3,753,577. These disclose vehicles with three wheels however with two wheels in the back and one steerable wheel in the front. This configuration resembles the traditional tricycle with the rider seated in a relatively high, upright position resulting in higher wind resistance and poor performance. In addition, these have typically been heavy weight vehicles with additional complexity of driving two rear wheels.

Other examples of three wheel recumbent vehicles describe vehicles with a single rear wheel including U.S. Pat. Nos. 3,913,929; 4,373,740; 4,410,198; 4,456,277; 4,548,421; and 4,993,733 and foreign patent SU 1406024. These vehicles have several drawbacks as follows.

U.S. Pat. No. 3,913,929 discloses a three wheel recumbent vehicle with a single rear wheel driven by two chains and two steerable front wheels which turn in the same plane. The long wheel base reduces maneuverability and does not allow short radius turns. In addition, the two front wheels turning in the same plane results in sliding of the wheels and higher rolling resistance. The rider support seat described does not provide a substantial back rest resulting in loss of effective leverage for pedalling.

U.S. Pat. No. 4,373,740 discloses a complex and heavy frame and a high seat position which increases wind resistance. Also described is a steering column which could interfere with rider movement and a long wheel base resulting in poor maneuverability. In addition, the vehicle does not provide lateral support for the rider during a turn.

U.S. Pat. No. 4,410,198 discloses a single tube main frame which is heavy due to bending loads, a steering column interfering with rider motion, and a single joy stick controller. The single tube frame is in bending and therefore heavy. The vehicle described does not address the steering mechanism required to eliminate sliding of the front wheels and does not provide lateral support for the rider during a turn. U.S. Pat. No. 4,456,277 discloses a front wheel drive recumbent vehicle with a complex and heavy frame. The additional complexity of front wheel drive requires a differential and front disc brake. The vehicle described has a long wheel base for poor maneuverability and employs a standard Ackerman steering arrangement.

U.S. Pat. No. 4,548,421 also discloses a vehicle with a single tube frame which is heavy and does not address the complex bending moments. It also discloses a steering column which interferes with rider movements and does not provide a steering mechanism for true rolling at the front wheels. In addition, the rider is not secured in the vehicle for lateral support during turning.

U.S. Pat. No. 4,993,733 discloses yet another vehicle with a single tube frame which is heavy and does not address the complex bending moments adequately. In addition, the long wheel base reduces maneuverability and the wheels turn in the same plane and so do not address the rolling condition at the road. Also the rider is not secured in the vehicle for lateral support during turning. Foreign Pat. SU 1406024 discloses a folding recumbent vehicle with a single tube frame and cantilever front wheel supports. The single tube frame with hinge points and cantilever members are in bending and therefore heavy.

Generally, the vehicles described are heavy, with a long wheel base and poor maneuverability. In addition, none of these address the issue of lateral support for the rider during turning. Other disadvantages which have been noted include rider discomfort with steering sensitivity due to excessive chatter or jittering of the wheels due to slight rider motions of the steering bar. Yet another disadvantage of the prior art includes a safety issue concerning visibility while riding among traffic due to the particularly low riding position.

It would be advantageous to provide a recumbent vehicle with a lightweight yet stiff frame and substantially foreshortened wheel base enabling a short turning radius which provides a safe, comfortable vehicle with lateral support for the rider during turning. It would also be advantageous to provide a vehicle with sensitivity adjustment in the steering mechanism to solve the problem of jittering of the steering wheels and a steering mechanism which independently controlled each wheel to a different angle thereby eliminating sliding of the wheels and reducing rolling friction. It would also be advantageous to provide a solution to the visibility problem in order to provide improved safety while riding in urban situations. The usefullness of such an invention is evidenced by greatly enhanced personal commuting and touring, particularly for long distance rides. The present invention relates to such a recumbent vehicle.

OBJECTS AND ADVANTAGES

Accordingly, several objects and advantages of the present invention are:

(a) to provide a recumbent vehicle with a low center of gravity, high stability and reduced wind resistance, (b) to provide a recumbent vehicle with improved comfort and safety of the rider while enabling greater force to be applied to the pedals, (c) to provide a recumbent vehicle with lateral support for the rider during turning, (d) to provide a recumbent vehicle with substantially foreshortened wheel base and improved maneuverability for short radius turns, (e) to provide a recumbent vehicle with efficient light weight frame structure, (f) to provide steering for the two front wheels which effect a turning of the vehicle wherein the inside wheel forms a greater angle than the outside wheel to eliminate sliding of the wheels, (g) to provide a vehicle with adjustability in the sensitivity of the steering mechanism to suit the comfort of the rider, (g) to provide a recumbent vehicle with improved visibility in urban traffic.

Further objectives and advantages are to provide a vehicle for transportation, recreation, and exercise that is useful for commuting and touring while reducing air pollution and traffic problems. Further objectives and advantages of the present invention will become apparent from consideration of the drawings and ensuing description of it.

SUMMARY OF THE INVENTION

The present invention comprises a short wheel base, three wheel recumbent vehicle. The main frame comprises a plurality of tubular members welded or joined in similar fashion including two main side members and one lower axial member. The rear frame comprises rear fork members supported by angled truss members for support in the direct line of the load path. The frame is supported by three wheels with one rear drive wheel and two front steerable wheels. The rear drive wheel is chain driven by a pedal crank assembly located substantially forward of the front wheels to provide clearance for the riders feet. The crank assembly is positioned for the rider in recumbent orientation with feet forward and above the level of the seat. The drive chain extends to the rear drive wheel under the vehicle through two sets of idler sprockets. The two front steerable wheels are positioned on either side of the rider in a substantially forshortened wheel base located to provide increased maneuverability.

The wheels are rotably mounted using a conventional bicycle head set arrangement to reduce cost and for simplicity. The wheels are steered by linkage mechanism including tie rods to each steering arm at the headset of each wheel. The tie rods are actuated by a center pivot plate which is in turn actuated by a steering rod connected to a steering bar with an adjustable location to provide steering sensitivity adjustment. The steering mechanism is such that the inside wheel forms a sharper turning angle than the outside wheel so that the lines of action of the front wheels intersect the line of action of the rear wheel substantially at the turning radius. The steering bar is rotably mounted to the main frame slightly forward of the seat. The steering bar includes a hand grip brake lever connected by a brake cable to a wheel brake on the rear wheel. Gear shift levers for both the front and rear de-railleurs are also positioned for convenience on the steering bar.

The seat is mounted to the main frame in front of the rear drive wheel and approximately midway between the wheel base.

A safety flag is mounted to the rear cross member of the frame to provide improved visibility while riding among traffic in urban situations.

Figure 1:
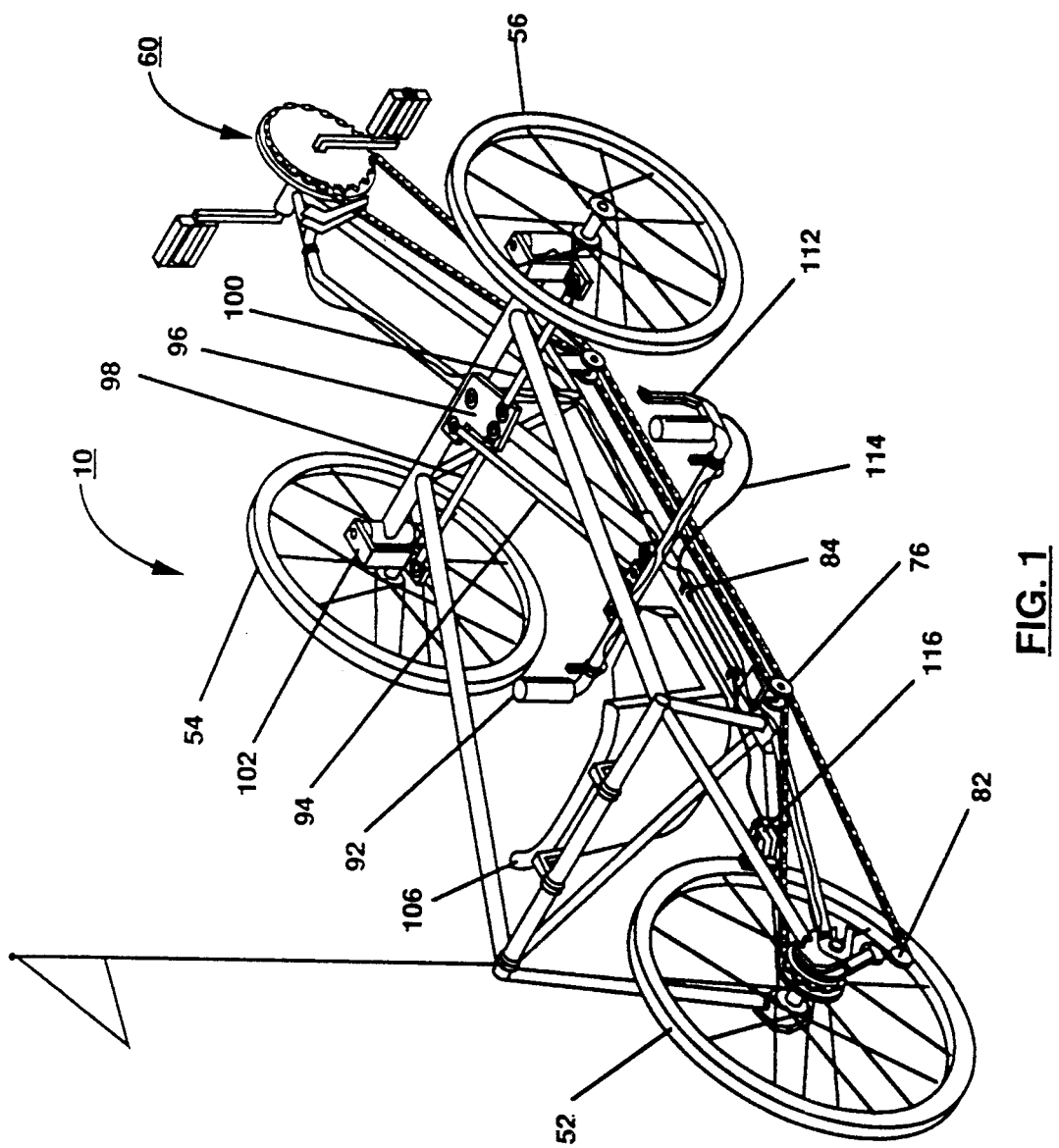
FIG. 1. is a perspective view showing the embodiment of the present invention.

| LIST OF REFERENCED PART NUMBERS |
| --- |
| 10 Recumbent Vehicle Assembly |
| 12 Frame Assembly |
| 14 Right longitudinal member |
| 16 Left longitudinal member |
| 18 Central longitudinal member |
| 20 Front Cross member |
| 22 Left head tube |
| 24 Right head tube |
| 26 Rear cross member |
| 27 Right vertical member |
| 28 Left vertical member |
| 29 Right rear strut |
| 30 Left rear strut |
| 32 Right drop out |
| 34 Left drop out |
| 36 Right rear fork |
| 38 Left rear fork |
| 40 Forward frame extension assembly |
| 42 Upper front extended member |
| 44 Lower front extended member |
| 45 Crank tube |
| 46 Right truss member |
| 48 Left truss member |
| 50 Vertical truss member |
| 52 Rear Wheel |
| 54 Left front wheel |
| 56 Right front wheel |
| 60 Crank Assembly |
| 62 Left pedal |
| 64 Right pedal |
| 66 Left crank |
| 68 Right crank |
| 70 Front drive sprocket |
| 72 Drive chain |
| 74 Forward idler sprocket |
| 76 Rear idler sprocket |
| 78 Variable speed driven sprocket |
| 80 Front de-railleur |
| 82 Rear de-railleur |
| 84 Cable clamps |
| 86 Rear sprocket shift lever |
| 87 Rear gear shift cable |
| 88 Front Sprocket shift lever |
| 89 Front gear shift cable |
| 90 Steering System |
| 92 Steering bar |
| 94 Steering push rod |
| 95 Steering sensitivity adjustment plate |
| 96 Center pivot plate |
| 97 Pivot pin |
| 98 Left tie rod |
| 100 Right tie rod |
| 102 Left steering arm |
| 104 Right steering arm |
| 106 Seat |
| 110 Brake system |
| 112 Hand brake lever |
| 114 Brake cable |
| 116 Wheel brake |
| 120 Safety flag |

| -continued |
|---|
| LIST OF REFERENCED PART NUMBERS |
| 122 Flag pole |

DETAILED DESCRIPTION OF THE PREFERRED EMBODIMENT

FIGS. 1, 2, 3, and 4 show the preferred embodiment of the three wheel recumbent vehicle 10, of this invention. The frame assembly 12, of this invention comprises a plurality of tubular members of steel, alloy steel, aluminum, or like material joined by welding, brazing, or like mechanical attachment method. Frame assembly 12 includes two longitudinal members 14 and 16 and one central longitudinal member 20 joined to front cross member 20. Two nearly vertical tubular members 22 and 24 are joined to the ends of front cross member 18 to support standard bicycle headsets for the forward mounted steerable wheels 54 and 56. These head tubes can be inclined from 1° to 2° from vertical to automatically straighten the vehicle after a turn in made. The rear of frame 12 comprises one rear cross member 26 joining longitudinal members 14 and 16 with left and right rear stuts 29 and 30. Right and left rear forks 36 and 38 extend rearward from the central longitudinal member 18 to the rear wheel drop outs 32 and 34. Two substantially vertical members 27 and 28, connect the ends of rear cross member 26 to lower center member 18. A forward frame extension assembly 40, comprises an upper front extended member 42 and lower front extended member 44, joined to front cross member 20 and central longitudinal member 18 respectively and joint together with crank tube 45. The upper front extended member 42 is bent at an angle to accept front de-railleur 80. Right and left truss members 46 and 48 join lower support 44 to front cross member 20 substantially at the joint to longitudinal members 14 and 16, respectively. This has the particular advantage of carrying the load in a direct path which eliminates bending moments in the frame and reduces weight. Another vertical truss member 50 joins lower front extended member 44 to upper front extended member 42 substantially at the center of front cross member 20.

The forward frame extension assembly 40 supports multi-sprocket crank assembly 60 comprising left and right pedals 62 and 64 joined by left and right cranks 66 and 68 to front drive sprocket 70. A drive chain 72 is directed below and along center longitudinal member 18 through a multiplicity of idler sprockets 74 and 76 mounted to center longitudinal member 18 and directed to variable speed driven sprocket 78 to provide multi-speed drive to rear drive wheel 52. Front de-railleur 80 and rear de-railleur 82 are operated by shift levers 88 and 86 respectively which are mounted to steering bar 92 for convenience. Gear shift levers 88 and 86 are connected to front and rear de-railleurs 80 and 82 by gear shift cables 87 and 89 which are routed along frame assembly 12 by a plurality of cable clamps 84.

Figure 4:
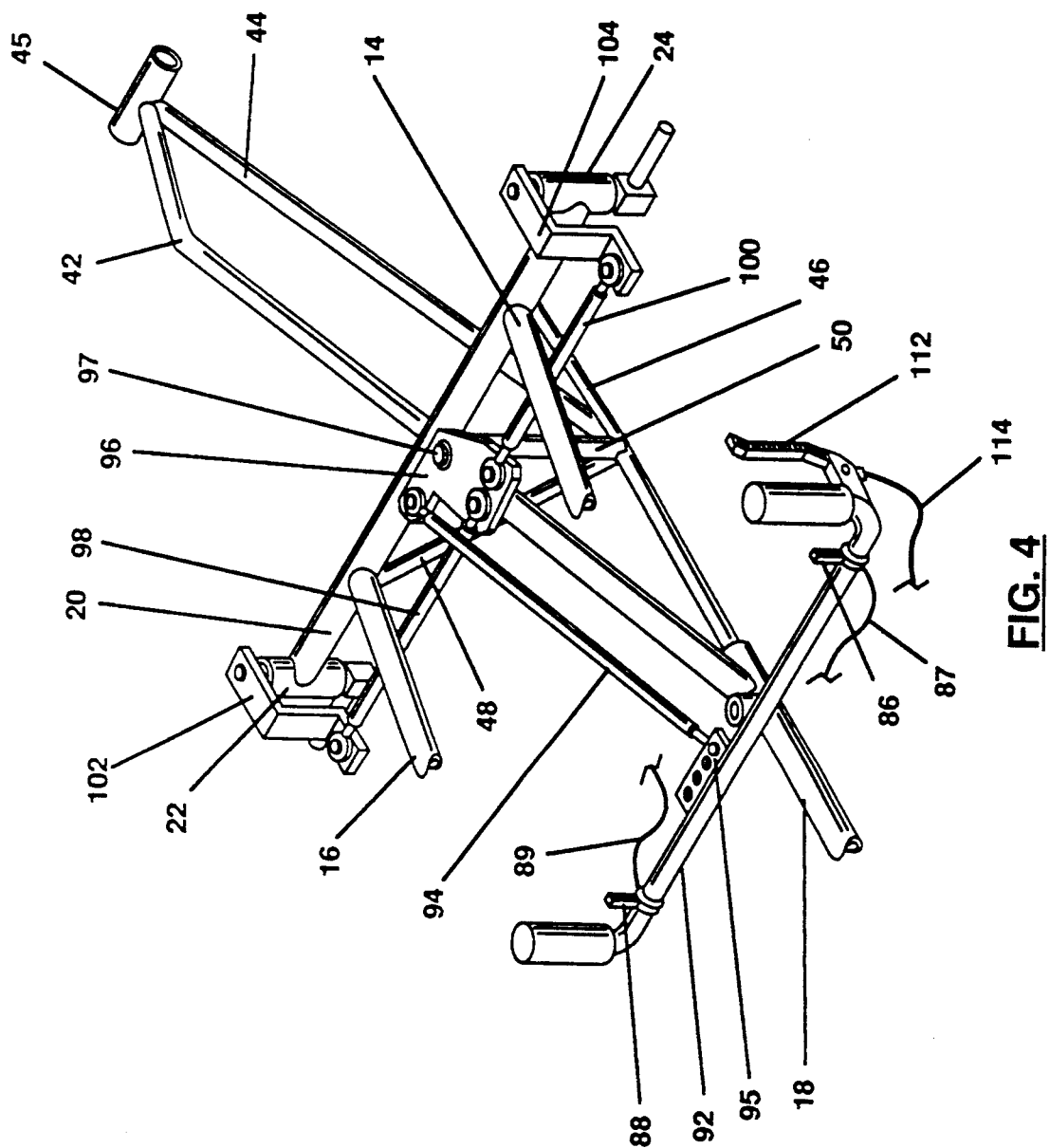
FIG. 4. is a perspective view of the steering assembly of the recumbent vehicle in FIG. 1.
Figure 5:
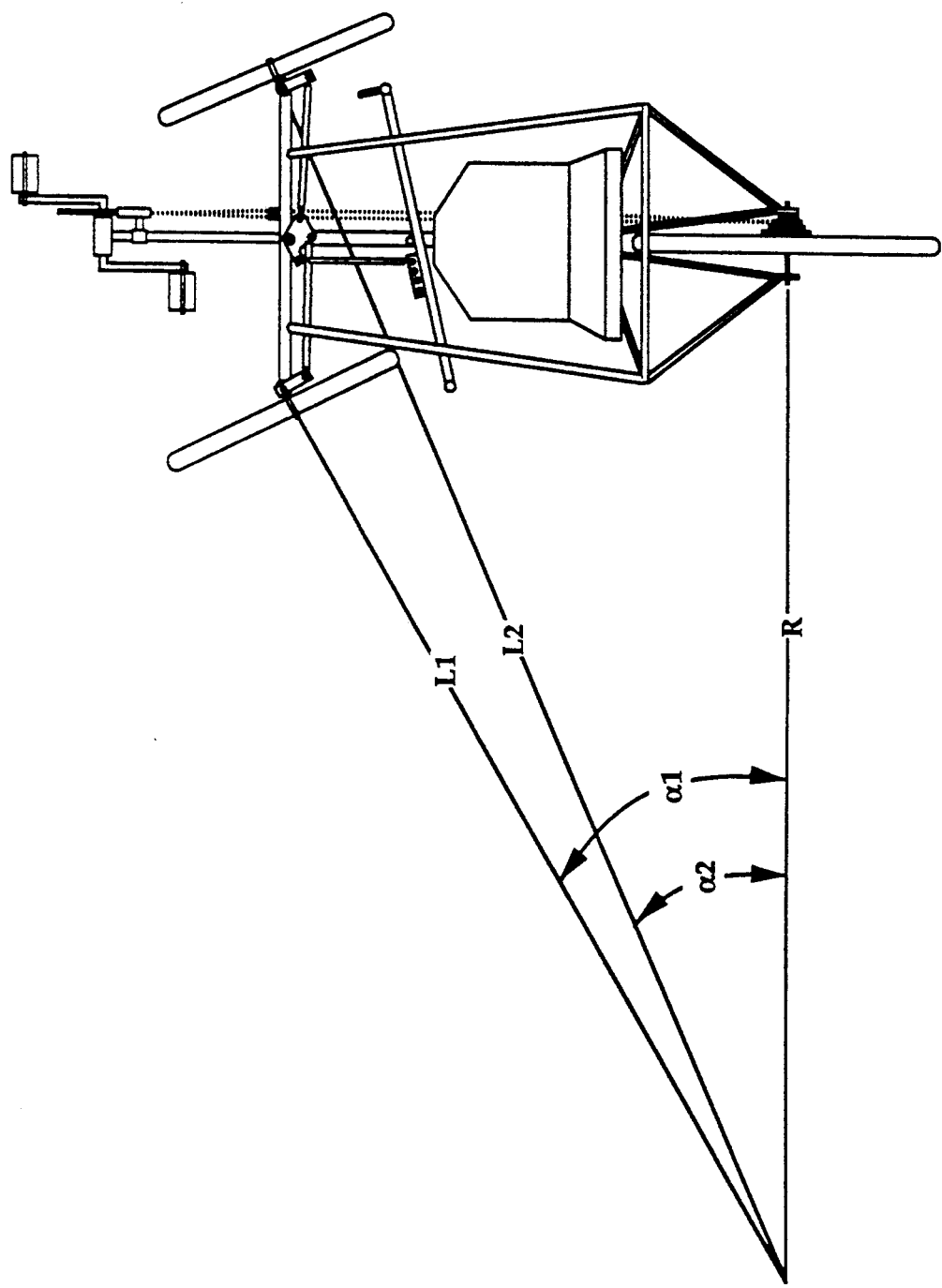
FIG. 5. is a plan view of the recumbent vehicle in FIG. 1 showing steering geometry in a left turn.

As shown in detailed FIG. 4, steering bar 92 is rotably mounted to central longitudinal member 18 slightly forward of seat 106. A steering push rod 94 is connected to steering bar 92 with adjustment plate 95. Steering push rod 94 is connected to center pivot plate 96. Center pivot plate 96 is rotably mounted to lower longitudinal member 18 by pivot pin 97. Left and right tie rods 98 and 100, connect from center pivot plate 96 to left and right steering arms 102 and 104, respectively. This arrangement provides adjustability in the steering mechanism to allow greater sensitivity response in the front wheels 54 and 56 as a result of turning steering bar 92. As shown in FIG. 5, the steering mechanism also provides the unobvious result of turning each of the forward axles to different angles $\alpha 1$ and $\alpha 2$ to the line of action of rear wheel 52 at turning radius R to eliminate sliding of the front wheels and reduce rolling friction.

Figure 2:
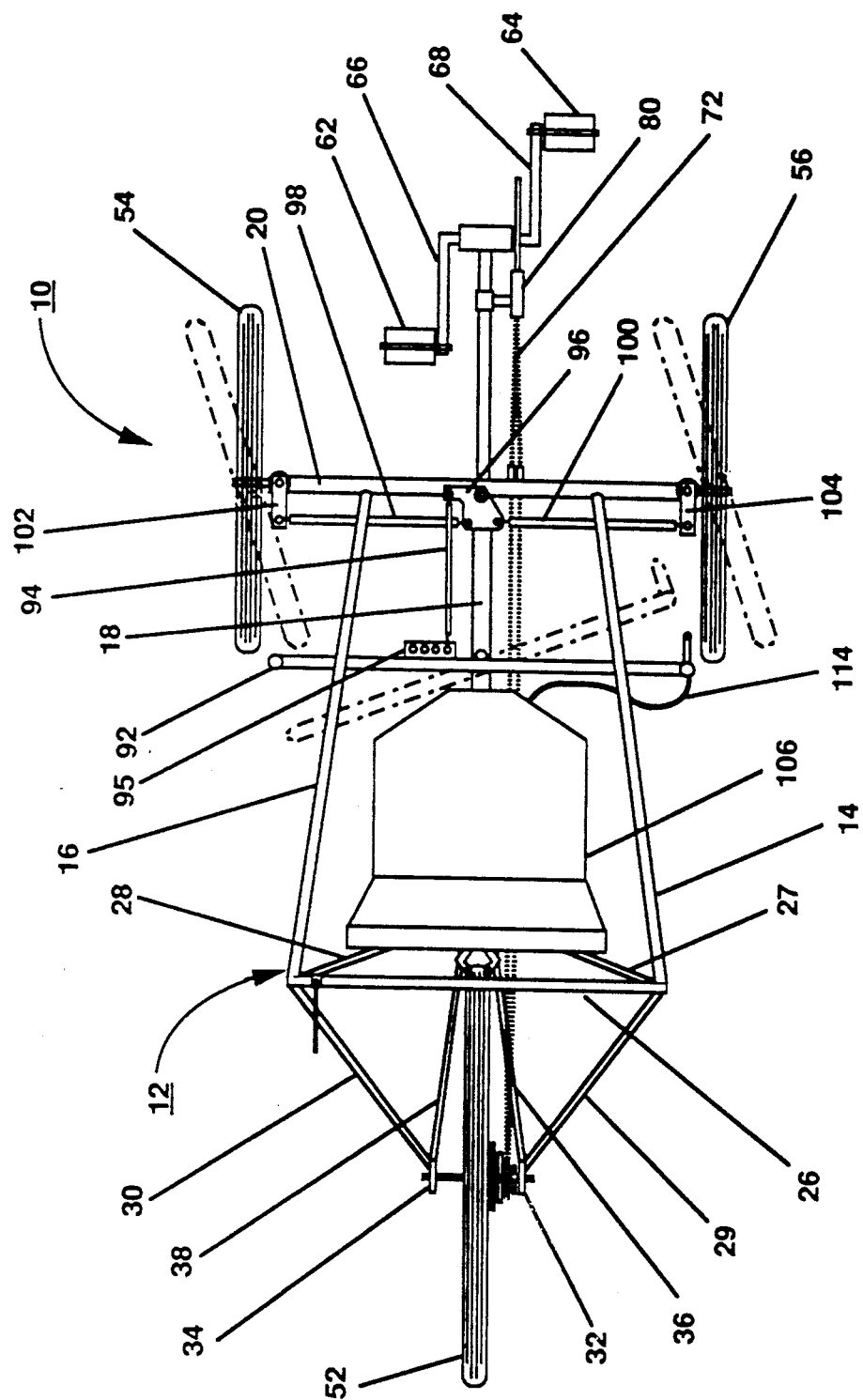
FIG. 2. is a plan view of the recumbent vehicle in FIG. 1.
Figure 3:
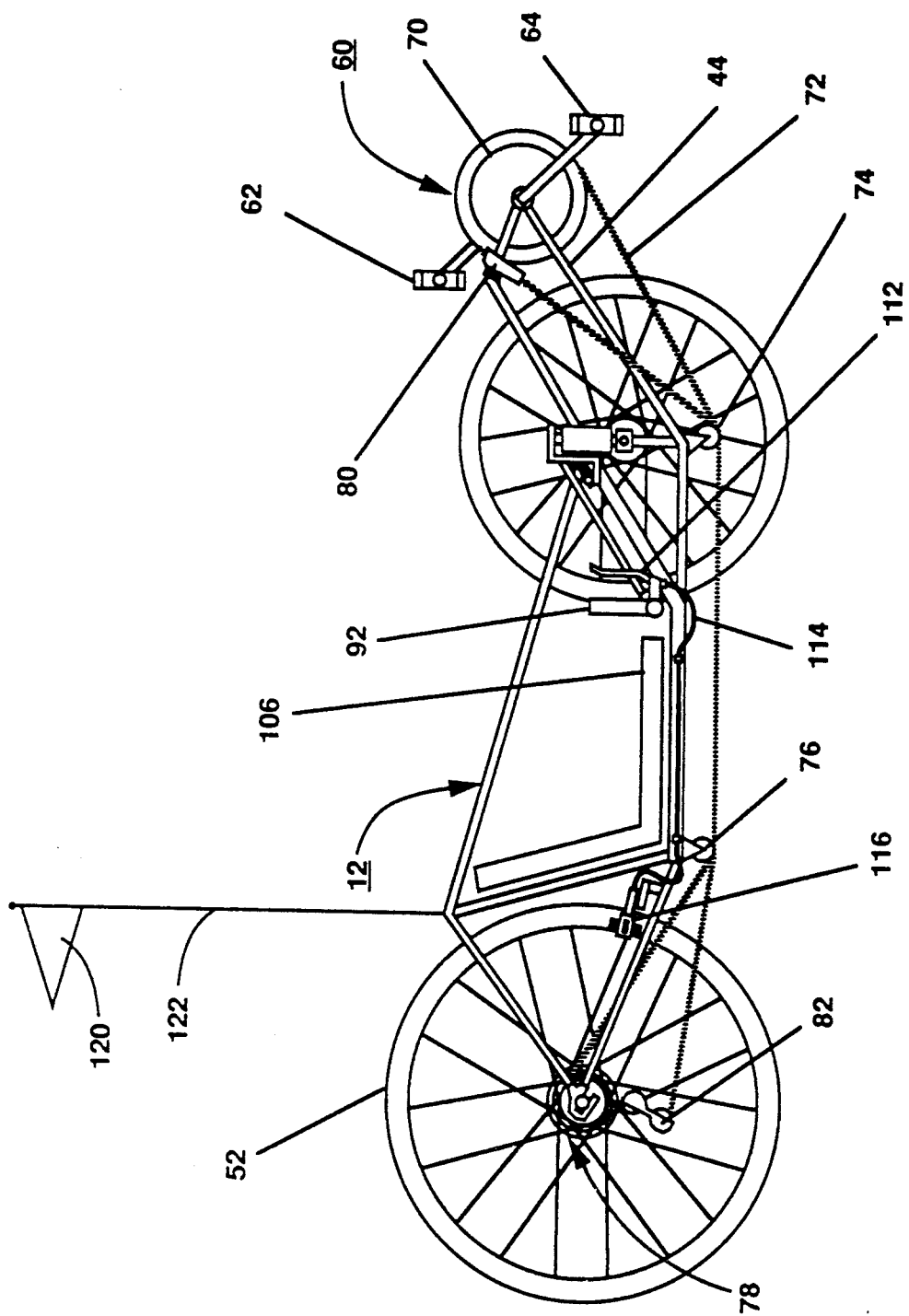
FIG. 3. is a side view of the recumbent vehicle in FIG. 1. with the right front wheel not shown for clarity.

As shown in FIGS. 1, 2, and 3, seat 106 is mounted to central longitudinal member 18 and rear cross member 26 essentially in the center of the vehicle forward of rear driven wheel 52.

Also positioned on steering bar 92 is a conventional handbrake lever 112 connected by brake cable 114 to conventional wheel brake 116 mounted on rear forks 36 and 38 to engage rear wheel 52.

A safety flag 120 is fixed to the top of flexible flag pole 122. The flexible flag pole is rigidly mounted to rear cross member 26 of main frame 12.

The present disclosed embodiments are to be considered illustrative of the invention which is intended to cover all changes and modifications of the example herein which do not constitute departures from the spirit or scope as defined in the following claims.

What is claimed is:
1. A recumbent vehicle comprising:
   a. a plurality of tubular members forming a triangulated main frame comprising a rear triangulated frame, a front triangulated frame including a central longitudinal member substantially along the centerline of said vehicle and two longitudinal members substantially parallel to said central longitudinal member whereby lateral restraint is provided during a turn, and a forward frame extension,
   b. a single rear drive wheel rotably mounted on rear end of said main frame,
   c. a seat positioned on said main frame forward of said rear drive wheel,
   d. a steering mechanism comprising:
      1. a steering bar rotably mounted on said main frame forward of said seat,
      2. a pair of front wheels rotatably mounted to said main frame,
      3. a pair of steering arms mounted to said front wheels,
      4. a center pivot plate rotably mounted on said main frame with center of rotation of said center pivot plate located substantially in line with center of rotation of said front wheels and halfway between said front wheels,
      5. a push rod directly connecting said steering bar and said center pivot plate,
      6. a pair of tie rods connecting said center pivot plate and said steering arms,
      7. a means for adjusting said steering mechanism whereby the sensitivity adjustment of the steering of said front wheels in response to the turning of said steering bar can be modified,
      8. said steering mechanism providing means for improved steering wherein said front wheels are controlled to form different angles which intersect substantially at the center of the turning radius of said vehicle,
   e. a drive means mounted on said forward frame extension including a front drive sprocket having foot pedals attached thereto, a variable speed driven sprocket affixed to said rear drive wheel, a drive chain connecting said front drive sprocket and said variable speed driven sprocket, and a plurality of idler sprockets mounted to said main frame whereby said drive chain is guided from said front drive sprocket to said variable speed driven sprocket.

2. The vehicle of claim 1, wherein said main frame is substantially forshortened such that the length between said front wheels and said rear drive wheel is approximately twice the diameter of said rear drive wheel.

3. The vehicle of claim 1, wherein said main frame further comprises a front cross member, a rear cross member parallel to said front cross member connecting the rear end of said longitudinal members, a rear fork assembly including two fork members extending rearward from the rear end of said central longitudinal member, two support members extending upward connecting the end of said fork members to the end of said longitudinal members substantially at the connection of said longitudinal members to said rear cross member.

4. The vehicle of claim 3, wherein said front cross member of said main frame is substantially half the length of said central longitudinal member.

5. The vehicle of claim 1, wherein said steering arms are essentially one tenth the length of said front cross member of said main frame, said center pivot plate length is essentially three fourths the length of said steering arms, and said center pivot plate width is essentially one half the length of said steering arms.

6. The vehicle of claim 1, wherein said rotable mounting is inclined by approximately 1° to 2° whereby said vehicle will straighten after a turn is made.

7. The vehicle of claim 6, wherein said means for steering sensitivity adjustment of said front wheels comprises an adjustment plate affixed to said steering bar with a plurality of holes along the length of said adjustment plate whereby said push rod can be connected at variable locations along said adjustment plate.

8. The vehicle of claim 1, wherein said steering bar includes a plurality of gear shift levers and a hand brake lever mounted to said steering bar.

9. The vehicle of claim 1, further comprising a safety flag mounted to said main frame whereby improved safety results from additional visibility of said safety flag.

* * * * *